US006613232B2

(12) United States Patent
Chesner et al.

(10) Patent No.: US 6,613,232 B2
(45) Date of Patent: Sep. 2, 2003

(54) MOBILE FLOATING WATER TREATMENT VESSEL

(76) Inventors: Warren Howard Chesner, C/O Chesner Engineering, P.C. 2171 Jericho Turnpike, Commack, NY (US) 11725; James Melrose, 600 Robinson Rd., Greenport, NY (US) 11944

(*) Notice: Subject to any disclaimer, the term of this patent is extended or adjusted under 35 U.S.C. 154(b) by 41 days.

(21) Appl. No.: 09/835,221

(22) Filed: Apr. 14, 2001

(65) Prior Publication Data
US 2002/0017483 A1 Feb. 14, 2002

Related U.S. Application Data
(60) Provisional application No. 60/190,809, filed on Mar. 21, 2000, and provisional application No. 60/197,551, filed on Apr. 17, 2000.

(51) Int. Cl.⁷ ............................................... B01D 61/14
(52) U.S. Cl. ..................... 210/650; 210/710; 210/747; 210/806; 210/170; 210/202; 210/242.1; 210/257.2; 210/321.69
(58) Field of Search ............................ 210/650, 702, 210/710, 747, 798, 806, 170, 202, 203, 205, 241, 257.2, 258, 259, 321.69, 409, 242.1

(56) References Cited

U.S. PATENT DOCUMENTS

| | | | |
|---|---|---|---|
| 692,557 A | 2/1902 | Swenson | |
| 852,713 A | 5/1907 | Gardner | |
| 1,047,233 A | 12/1912 | Jackson | |
| 4,038,184 A | 7/1977 | Svanteson | 210/59 |
| 4,197,200 A | 4/1980 | Alig | 210/104 |
| 4,670,150 A | 6/1987 | Hsuing | 210/636 |
| 5,128,050 A | 7/1992 | Gill | 210/755 |
| 5,173,182 A | 12/1992 | Debellian | 210/170 |
| 5,192,451 A | 3/1993 | Gill | 210/755 |
| 5,256,423 A | 10/1993 | Eguisa et al. | 424/616 |
| 5,374,356 A | 12/1994 | Miller et al. | 210/641 |
| 5,421,109 A | 6/1995 | Steele | 37/345 |
| 5,561,922 A | 10/1996 | Lynch | 37/317 |
| 5,578,213 A | 11/1996 | Miller | 210/641 |
| 5,816,181 A | 10/1998 | Sherman | 114/25 |
| 5,932,091 A | 8/1999 | Tompkins | 210/97 |
| 5,932,112 A | 8/1999 | Browning | 210/750 |
| 5,938,936 A | 8/1999 | Hodges et al. | 210/705 |
| 6,038,795 A | 3/2000 | Navarro | 37/341 |
| 6,125,778 A | 10/2000 | Rodden | 114/74 R |
| 6,156,192 A | 12/2000 | Rummler | 210/153 |

OTHER PUBLICATIONS

National Research Council, 1996. Stemming the Tide: Controlling Introductions of Nonindigenous Species by Ship's Ballast Water, National Academy Press, Washington, DC.
International Maritime Organization, 1998. Guidelines for the Control and Management of Ships' Ballast Water to Minimize the Transfer of Harmful Aquatic Organisms and Pathogens, London, 1998.
Motor Ship, 2000, Ballast Water Management: Balancing Green Issues with Safety, Motor Ship, May 2000.
United States Environmental Protection Agency, 1994, Assessment and Remediation of Contaminated Sediments (ARCS) Program, Remediation Guidance Document, USEPA 905–B94–003, Oct. 1994 Chapter 4, 16 pages.
PCT Written Opinion, Dec. 19, 2001, International Application No. PCT/US01/09025 of Warren Howard Chesner and James Melrose.

Primary Examiner—Christopher Upton
(74) Attorney, Agent, or Firm—Alfred M. Walker

(57) ABSTRACT

A floating mobile self-contained membrane filtration treatment vessel that is suitable for use in the treatment of contaminated marine waters and shipboard wastes including, but not limited to, ballast water, graywater, and blackwater and excess dredge waters. The mobile treatment vessel preferably includes a micro or ultrafiltration membrane treatment system for micron and submicron sized particulate removal.

40 Claims, 3 Drawing Sheets

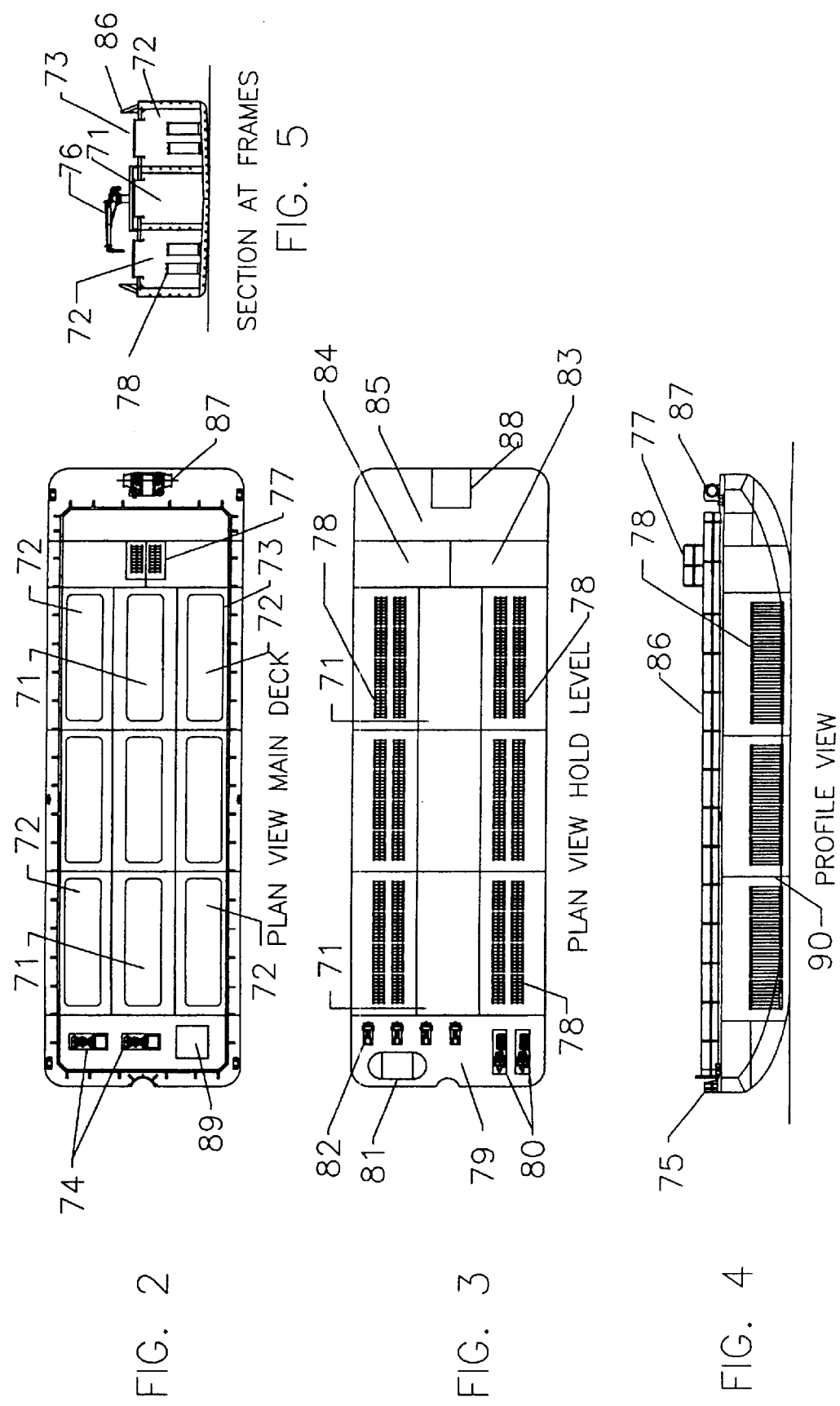

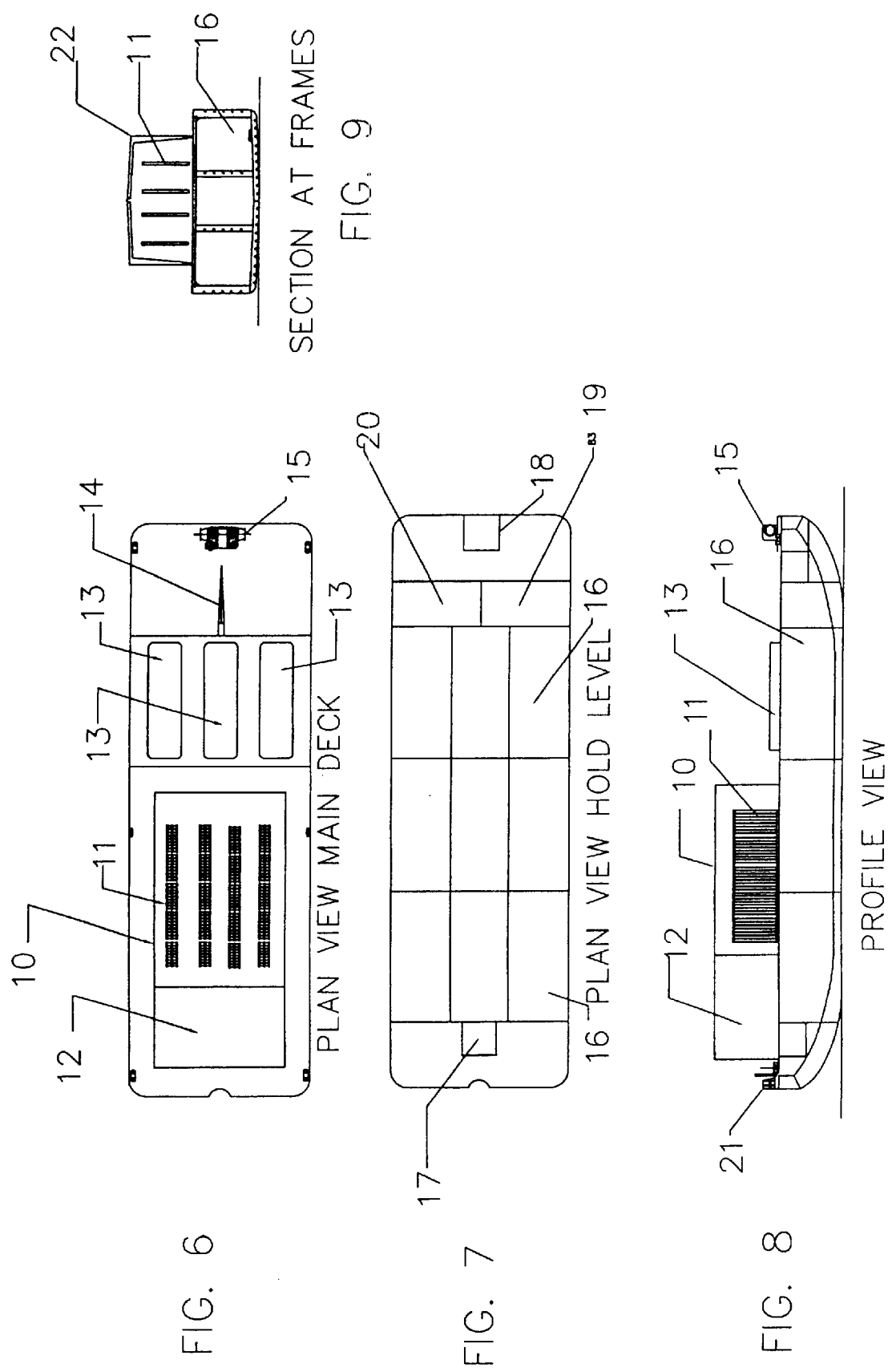

MOBILE FLOATING WATER TREATMENT VESSEL

TECHNICAL FIELD OF THE INVENTION

This application claims benefit of provisional application Ser. No. 60/190,809 filed Mar. 21, 2000, which claims benefit of Ser. No. 60/197,551 filed Nov. 17, 2000.

This application relates to a process for in situ treating of ballast water, graywater and blackwater aboard sea-going vessels, with a floating mobile vessel having a membrane filtration system thereon. Such a vessel is also useful for treating excess water generated during the process of dredging contaminated sediments from the bottom of lakes, reservoirs, rivers, and other water bodies. The method of water treatment proposed has numerous alternative applications in the marine environment.

BACKGROUND OF THE INVENTION

In the marine environment the generation and discharge of contaminated wastewaters need to be controlled to avoid polluting said environment. In particular, sea-going vessels must discharge ballast water, graywater from laundry and dishwashing etc., and blackwater sewage directly into a body of water, such as an ocean. In addition, during sediment dredging operations excess waters are generated that can be contaminated if the sediments being excavated contain pollutants such as heavy metals or problematic organic compounds.

Current strategies to control these discharges vary from location to location, but in general wastewaters from sea-going vessels are managed by either discharging said waters in deeper ocean waters away from the coastline, installing treatment systems on-board the offending sea-going vessel, or storing said waters on the offending vessel and pumping said waters to a treatment or transfer facility at the docking port. Wastewaters generated during dredging operations, if such waters are contaminated, are, in almost all cases, pumped to an on-shore impoundment or treatment facility for management.

This invention includes methods and processes for managing such waters using a mobile floating water treatment vessel with membrane filtration treatment technology capable of achieving highly efficient degrees of treatment that can readily address the primary concerns associated with marine wastewater discharges. This can be accomplished without the need for on-board or on-shore treatment systems. As will be readily apparent upon further elaboration of these marine wastewater discharges and the water treatment approach associated with this invention, the development of such a mobile treatment system lends itself not only to the treatment of ballast water, graywaters, blackwaters, and contaminated dredge waters, but also to the treatment or pretreatment of raw marine water for potable water use or near-shore industrial discharges should such treatment be necessary.

Ballast Water

Ballast in the form of water is taken on board vessels to reduce the stresses in the hull of the ship, to provide for transverse stability, to aid propulsion by controlling submergence of the propeller, and to aid in maneuverability by submerging the rudder and reducing the amount of exposed hull surface (free board and windage) and to compensate for weight loss from fuel and water consumption. Dry bulk carriers, ore carriers, tankers, container ships, general cargo vessels, passenger vessels, and military vessels all take on ballast water either in port or during a voyage. Most ships deballast (discharge ballast water) during cargo loading operations and take on ballast water during cargo unloading operations.

As a result of ballasting and deballasting operations, oceangoing vessels can be expected to transport marine organisms, contained in the ballast water, from any port in the world to any other port in the world. The development of effective methods to control the transport and/or release of nuisance organisms that are found in ballast water is a problem facing the international maritime community. When such nuisance organisms (mollusks, crustaceans, worms, seaweed, algae, fungi, and protozoa) present in the ballast water (taken on board from a foreign port) are introduced into a new ecosystem (by discharging of the ballast water into a secondary port's coastal environment), there are often no natural predators for these organisms (commonly referred to as aquatic nuisance species). Introducing aquatic nuisance species into new environments can have serious environmental consequences. The threat of non-indigenous species introduced through ship deballasting is a worldwide problem. Ships deballast in ports everywhere in the world impacting local fishing industries and the ecology (National Research Council, 1996. Stemming the Tide: Controlling Introductions of Nonindigenous Species by Ships' Ballast Water, National Academy Press, Washington, D.C.).

At the present time, the most common strategy for controlling foreign species present in ballast water is the ballast water exchange process. In this process cargo vessels unload ballast water (taken on board at a local port after discharging cargo) into the open ocean and exchange the discharged ballast water with mid-ocean seawater (International Maritime Organization, 1998. Guidelines for the Control and Management of Ships' Ballast Water to Minimize the Transfer of Harmful Aquatic Organisms and Pathogens, London, 1998). While currently the standard recommended practice, this method is generally not considered to be very effective in controlling aquatic nuisance species because 1) organisms often continue to survive in the sediment and residual water in ballast tanks; 2) the process can take 6 to 24 hours and subject a vessel to instability during turbulent weather, resulting in serious safety issues; and 3) mid-ocean ballast water exchange can also stress the structural integrity of cargo vessels, particularly under turbulent weather conditions (Motor Ship, 2000, Ballast Water Management: Balancing Green Issues with Safety, Motor Ship, May 2000).

Other technologies being proposed or investigated for treating ballast water include particle filtration processes, gravity processes (sedimentation, flotation, and centrifugation), thermal processes (pasteurization at 60° C. to kill organisms), electromagnetic radiation (UV lamps), chemical treatment (including chlorination, ozonation, pH adjustment, deoxygenation, and salinity adjustment), and gaseous sterilization (using the exhaust gases from the ship's engine to kill organisms) (National Research Council, 1996. Stemming the Tide: Controlling Introductions of Nonindigenous Species by Ships' Ballast Water. National Academy Press. Washington, D.C.).

A number of recent U.S. patents have been issued on proposed ballast water treatment approaches. Gill, Method for Controlling Zebra Mussels in Ship Ballast Tanks, U.S. Pat. No. 5,128,050, Jul. 7, 1992, proposes to control zebra mussels or its larvae by introducing the chemical didecyl dimethyl ammonia halide into ballast water tanks. Eguisa and Fukuyo, Method for Destroying Cyst of Noxious Plankton, U.S. Pat. No. 5,256,423, Oct. 26, 1993, propose a strategy to control the cyst of noxious plankton by introducing hydrogen peroxide. Sherman, Ballast Water Treatment System, U.S. Pat. No. 5,816,181, Oct. 6, 1998, proposes to pump the ballast water through heat exchangers on board a vessel using the waste energy from the propulsion system of the vessel as the heat source. Browning, Method and Apparatus for Killing Microorganisms in Ship Ballast Water, U.S. Pat. No. 5,932,112, Aug. 3, 1999, proposes a deoxygenation approach designed to suffocate the organisms contained in the ballast water. Rodden, Ballast Water Treatment, U.S. Pat. No. 6,125,778, Oct. 3, 2000, proposes the treatment of ballast water with ozone while the vessel is in transit between ports. Rodden describes several proposed methods for contacting the ballast water with the ozone to effect this treatment approach.

While all of the above methods offer some potential treatment options, the introduction of chemical reagents into ballast water tanks to kill nuisance organisms could have adverse impacts on receiving waters when the ballast water is discharged. Heat treatment and deoxygenation strategies may be possible in theory, but many microbes are capable of overcoming such environments through spore formation and anaerobic activity. Ultraviolet radiation is untested at such high flow rates and the effectiveness of these approaches with liquids containing high levels of suspended solids are questionable. In short, none of the currently proposed strategies offers solutions that appear practical. In addition, the focus of essentially all the aforementioned treatment applications has been to consider the siting of such treatment systems on-board the offending vessel. Siting these facilities on-board the offending vessel means that all existing vessels must be retrofitted to install the necessary equipment and all new vessels must be designed to have the necessary equipment installed during fabrication. The cost of retrofitting existing vessels and installing treatment equipment on all new vessels will be extremely high.

Graywater and Blackwater

Graywater as defined by the International Maritime Organization means drainage from dishwashers, showers, laundries, baths, washbasins and galleys. Blackwater is comprised primarily of wastewater from toilets, urinals, and medical facilities. Graywater discharges in the past have not been subjected to permitting or regulatory requirements, however, with the proliferation of cruise line trips in recent years, local, state, and national environmental agencies are in the process of developing requirements for managing these discharges. Blackwater treatment utilizing marine sanitation devices is already required under U.S. Federal law. These sanitation devices usually encompass either chemical and/or biological treatment.

While blackwaters can be treated to reduce the oxygen demand and suspended solids content of such waters using conventional sewage treatment processes, incorporating such processes in a compact manner that can manage shipboard wastes requires more innovative approaches. A number of U.S. patents have been issued for systems designed for the treatment of shipboard-generated graywaters and blackwaters.

Svanteson, Method of processing Waste on Ships and the Like and Arrangement for Carrying Out the Method, U.S. Pat. No. 4,038,184, Jul. 26, 1977, introduced a method for treating shipboard blackwaters using a rotating drum, with knife-edged elements to shred the solid materials in the waste stream, and with hot air introduced into said drum for the purpose of evaporating the liquid waste, leaving only solids for collection and disposal. Svanteson proposed the use of waste heat from the ship's machinery as the energy source for the hot air used in the evaporation process. Alig, Shipboard Blackwater Physical/Chemical Treatment System, U.S. Pat. No. 4,197,200, Apr. 8, 1980, proposed the use of ozonation for the disinfection of shipboard blackwater after the removal of solids using a screening device and the pumping of the collected solids to the ship's boilers for incineration. Rummier, Waste Treatment System, U.S. Pat. No. 6,156,192, Dec. 5, 2000, proposed a waste treatment system for blackwaters and graywaters generated in household, commercial, industrial environments, and shipboard environments that makes use of liquid-solid separation processes, incineration processes using microwave technology, and disinfection processes using oxidants and ultraviolet radiation treatment.

Miller et al, Fluid Treatment Process Using Dynamic Microfiltration and Ultrafiltration, U.S. Pat. No. 5,374,356, Dec. 20, 1994, proposed a method for recycling shipboard graywaters using membrane filtration technology. Miller's invention incorporates a two-stage process requiring microfiltration and ultrafiltration. In this two-staged process, as the graywater is filtered through each stage, the influent is divided into a filtrate or permeate stream and concentrate streams. Miller employs in his invention dynamic microfiltration and cross-flow ultrafiltration processes. Dynamic filtration is a process where the membrane filter medium is in motion to induce high shear forces on the membrane. This assists in maintaining a filter-free medium, free from plugging or fouling.

Miller follows his ultrafiltration process with ozonation and ultraviolet light radiation to both sterilize the graywater and oxidize organic compounds. Miller's primary purpose is to generate a water stream that can be recycled. While the filtrate is intended for reuse, the concentrate stream generated during the microfiltration and ultrafiltration operation must be discharged to shore-side treatment facilities. Miller, Fluid Treatment Process, U.S. Pat. No. 5,578,213, Nov. 26, 1996, presents modifications to his 1994 invention by introducing pretreatment processes for free oil removal and post-treatment adsorbent bed systems to remove organic and inorganic contaminants such as chlorine and metal ions and eliminating the cross-flow ultrafiltration step in his 1994 invention.

While there has and continues to be work undertaken to develop more cost effective technologies for managing shipboard wastewaters, strategies to manage graywater or blackwater have exclusively been limited to the establishment of treatment systems either on-board the offending vessel or strategies that require the discharge of these wastewaters to a land-based treatment system.

Dredge Water

It is the nature of current subsurface dredging or subsurface sediment excavation processes that during said excavation, particulate matter will be dispersed into the water column. This occurs because dredging to extract and remove bottom sediments involves mechanically raking, grabbing, penetrating, cutting, or hydraulically scouring the bottom of the waterway to dislodge sediment. This is a special problem when the dredge site contains highly contaminated materials that must be removed without dispersing the sediments and contaminating alternate locations. Bottom sediments disturbed by dredging operations, but not removed from the water body, pose several environmental problems. If the sediments are contaminated, the resuspension of particles provides the means for contaminants to migrate from their original source to new locations, impacting marine life in these areas and ultimately the ecosystem and food chain.

Of particular concern is the resuspension of fine clay and organic sediment particles (micron- and submicron-sized).

Such particles tend to concentrate contaminants due to their high absorptive properties and the large surface areas that are cumulatively available in this very small size range. In addition to sediment toxicity problems, excessive particulate resuspension in environmentally sensitive areas results in visible turbidity, which may inhibit fish migration or reproductive patterns, impair fish gills, or cover larvae, eggs or bottom-feeding invertebrates (United States Environmental Protection Agency, 1994, Assessment and Remediation of Contaminated Sediments (ARCS) Program, Remediation Guidance Document, USEPA 905-B94-003, October 1994).

Current methods of dredging can be divided into two general categories. They include mechanical dredging and hydraulic dredging. The fundamental difference between these categories is in the form in which the sediments are removed. Mechanical dredges remove the sediments directly with clamshell-type buckets. The operation consists of lowering the bucket with a crane to the bottom of the waterway, scooping or extracting the sediment, and bringing the sediment to the surface for disposal (typically in a dredge barge). Hydraulic dredges, sometimes referred to as vacuum dredges, are designed to vacuum-up bottom sediments. Unless the sediments are very loose, vacuum dredges require cutter heads or alternative means to dislodge the dredge material so that the sediment can be vacuumed into the dredge head.

To effectively collect contaminated particles suspended during the dredging process, it is necessary to collect both the particulates and a given quantity of water, associated with the water column into which said particles are dispersed. When hydraulic dredges are used to excavate contaminated sediments, the sediment and the vacuumed water are almost always pumped to an on-shore impoundment or treatment facility where the sediment is separated from the water and the excess water is treated. Mechanical clamshell-type dredges typically excavate within confined silt curtains and do not manage excess waters and particulates, although the authors of this patent have recently submitted a patent application (provisional Patent Serial No. 60/190,809 filed Mar. 21, 2000) that describes a mechanical clamshell bucket system that is housed in a pressure-controlled enclosure that collects and contains dispersed particulates generated during the clamshell bucket excavation process and pumps the particulates and water contained in the housing to a treatment facility; and have also submitted a second patent application (provisional patent Serial No. , filed on Mar. 9, 2001) that describes a mobile barrier vessel in which sheet piles along with a drape are lowered from the vessel to the subsurface to create a sealed control zone in which a clamshell bucket can excavate contaminated sediment, while the liquid in the control zone is pumped to a treatment facility.

While mechanical clamshell-type dredges typically do not draw water under vacuum during the excavation process, they do collect and deposit excess water into the dredge barge. If the excess water is extracted from the barge, it must be treated prior to discharge. Otherwise the water must be transported and disposed of with the contaminated sediments.

In both hydraulic and mechanical dredging operations, the siting and permitting of on-shore impoundment and/or treatment facilities to manage contaminated dredge waters are major problems when the dredging of contaminated sites are being planned.

OBJECTS OF THE INVENTION

It is an object of the present invention to provide a mobile, floating treatment vessel to treat contaminated water generated in the marine environment with a membrane filtration treatment system to enable the discharge of this treated water back into the ambient environment.

It is also an object of this invention to collect ballast water from vessels entering a port or harbor area.

It is a further object of the invention to provide a method for treating ballast water to remove essentially all aquatic nuisance organisms from the ballast water using membrane filtration technology.

It is a further object of the invention to use polymeric membranes capable of micro and ultrafiltration as a ballast water treatment method.

It is a further object of the invention to use either pressurized or immersed vacuum driven hollow fiber membrane treatment systems to treat the ballast water.

It is a further object of the invention to provide such a ballast water treatment system on-board a self-contained treatment vessel.

It is a further object for this self contained ballast water treatment vessel to contain the necessary equipment and treatment operation to pump the ballast water, recirculate and treat the retentate stream, collect, stabilize, and treat solids and organisms removed from the ballast water, and clean and maintain the filters used in the process.

It is a further object of the invention to discharge treated ballast water directly back into the port ambient water environment.

It is a further object of the invention to convert the collected solids generated in the ballast water treatment process system to a stabilized form prior to disposal.

It is a further object of the invention to collect ballast water from incoming vessels, which require treatment, by direct discharge into the ballast water treatment vessel or by discharge into intermediate storage barges available to store the ballast water until such time as treatment may be effected.

It is also an object of this invention to collect dredge water from the discharge of dredging operations designed to remove sediments from the bottom of waterways.

It is a further object of the invention to provide a method for treating dredge water to remove essentially all suspended solids from the dredge water using membrane filtration technology and provide pre-or post-treatment to remove soluble metals and/or organic compounds, if necessary.

It is a further object of the invention to use polymeric membranes capable of micro and ultrafiltration as a dredge water treatment method.

It is a further object of the invention to use either pressurized or immersed vacuum A driven hollow fiber membrane treatment systems to treat the dredge water.

It is a further object of the invention to provide such a dredge water treatment system on-board a self-contained treatment vessel.

It is a further object for this self contained water treatment vessel to contain the necessary equipment and treatment operation to pump the dredge water, recirculate and treat the retentate stream, collect, stabilize, and treat solids removed from the dredge water, and clean and maintain the filters used in the process.

It is a further object of the invention to discharge treated dredge water directly back into the ambient water environment.

It is a further object of the invention to convert the collected solids generated in the dredge water treatment process system to a stabilized form prior to disposal.

It is a further object of the invention to collect dredge water from the dredging operations by direct discharge into the dredge water treatment vessel or by discharge into intermediate storage barges available to store the dredge water until such time as treatment may be effected.

It is also an object of this invention to collect graywater or blackwater from vessels entering a port or harbor area or at a designation location.

It is a further object of the invention to provide a method for treating graywater or blackwater to remove essentially all suspended solids and a large fraction of organic matter, if necessary, using membrane filtration technology.

It is a further object of the invention to use polymeric membranes capable of micro and ultrafiltration as a graywater or blackwater treatment method.

It is a further object of the invention to use either pressurized or immersed vacuum driven hollow fiber membrane treatment systems to treat the graywater or blackwater.

It is a further object of the invention to provide such a graywater or blackwater treatment system on-board a self-contained treatment vessel.

It is a further object for this self contained water treatment vessel to contain the necessary equipment and treatment operation to pump the graywater or blackwater, recirculate and treat the retentate stream, collect, stabilize, and treat solids removed from the graywater or blackwater, and biologically treat such water, if necessary, and clean and maintain the filters used in the process.

It is a further object of the invention to discharge treated graywater or blackwater directly back into the ambient water environment.

It is a further object of the invention to convert the collected solids generated in the graywater or blackwater treatment process system to a stabilized form prior to disposal.

It is a further object of the invention to collect graywater and blackwater from incoming vessels, which require treatment, by direct discharge into the graywater or blackwater treatment vessel or by discharge into intermediate storage barges available to store these waters until such time as treatment may be effected.

It is also an object of the present invention to improve over the disadvantages of the prior art.

SUMMARY OF THE INVENTION

In keeping with these and other objects of the invention, which will become apparent, a method is provided for treating marine waters and wastewaters generated on or near the marine environment by filtering such waters through membrane filters capable of removing particulate matter including organisms in the micron and submicron range (microfiltration and ultrafiltration), discharging the permeate (clean water) back into the ambient environment, and concentrating and disposing of solid materials separated in the process. While the process described herein can be placed on-shore or on offending vessels, in keeping with the object of the invention, the treatment process as envisioned is part of a self-contained mobile treatment vessel. Such vessels can be employed at local ports, harbors, and coastal areas to accept discharges from vessels or operations that generate contaminated waters, thereby eliminating the need for an on-shore or shipboard treatment systems. Such vessels can also complement the shipboard operations by accepting portions of the waste stream not adequately handled or treated on board the offending vessel. Such a treatment vessel has direct applicability but is not limited to the treatment of ballast water, shipboard wastewaters such as graywaters and blackwaters, or dredge water.

This invention therefore includes a preferred embodiment for a mobile treatment vessel with a micro- or ultra-filtration membrane treatment system for micron and submicron sized particulate removal. Such a vessel and treatment system has not been previously applied for the treatment of ballast waters or dredge waters. Although membrane treatment systems are being considered for the treatment of shipboard wastewaters such as graywater or blackwater, such treatment systems have not been applied on a self-contained mobile treatment vessel which receives and treats contaminated water from a separate location, prior to discharging the treated water into an ambient marine environment. The treatment system of this micro or ultrafiltration membrane treatment embodiment is a multistage treatment system. The first stage includes flow equalization and pretreatment. This stage is intended to equalize the flow and to provide preliminary solids removal and, if necessary, oily water separation. The second stage includes the membrane system. This stage is designed to remove very fine micron and submicron-sized particles remaining in the water. If needed, post-treatment could be included in subsequent stages to remove residual soluble contaminants in the effluent stream using processes such as activated carbon adsorption, chemical oxidation, or ultraviolet radiation processes.

The main component of the system is the membrane filtration process.

Commercially available membrane filters act as barriers that can be used to separate particulate and dissolved components in both liquid and gaseous streams. The particular focus of the treatment proposed in this invention is separation of particles in the microfiltration (~0.1 to 10 microns) and the ultrafiltration (~0.01 to 0.1 micron) range.

There are presently two major types of commercially available microfiltration and ultrafiltration systems. These are polymeric and ceramic systems. These two systems are typically categorized, with respect to the supporting membrane module or configuration, as hollow fiber polymerics, tubular polymerics, spiral wound polymerics, plate polymerics, tubular ceramics, or dense-pack ceramics. Other membrane configurations or modifications of existing configurations, such as flat membrane systems, rotary cylinders, and rotating disc modules are also in use and new configurations are in continual development. The inventors, having tested both ceramic and polymeric systems, have found polymeric low pressure or vacuum-driven hollow fiber membrane systems to be the preferred system from a cost and effectiveness viewpoint for the subject application.

Most microfiltration and ultrafiltration systems in operation at the present time utilize positive pressure as a driving force to pass liquids through the membrane. Pressurized systems are typically operated in a dead-end mode or in a cross-flow mode. In a dead-end mode, all of the incoming raw water, with the exception of a relatively small retentate stream, sometimes referred to as a blowdown stream, is passed through the membrane. The small retentate stream is wasted to control solids buildup. In a cross-flow mode the feed is pumped tangentially to the membrane surface. In such an operation, one stream enters a membrane module (the feed stream) and two streams exit (a relatively large recirculation stream and the permeate stream). The cross-flow stream induces a shearing action on the membrane, and hence cleaning which leads to reduced particulate fouling or caking and a higher average flux rate than a dead-end operation. In this system, a retentate or blowdown stream is extracted from the recirculation stream to control solids buildup. Dead-end pressurized systems typically operate under lower transmembrane pressures than cross-flow systems. An alternative to dead-end or cross-flow operation is dynamic microfiltration. Dynamic microfiltration is a positively pressurized operation in which the filter medium is moved (typically rotated) at sufficient speed relative to the fluid stream to produce sufficient shear forces to maintain a free filter surface for extended periods of time. While dead end, cross flow, or dynamic microfiltration membrane systems are suitable for use in the subject invention, the preferred embodiment of this invention is a system that operates under low pressure. A dead-end system, which typically operates under a positive transmembrane pressures that are less than approximately 30 pounds per square inch, and is comprised of hollow fiber membranes, is a preferred system for use on a self-contained water treatment vessel.

In recent years, immersed or submerged vacuum-driven hollow fiber membranes have been introduced commercially. An immersed hollow fiber membrane filter operating under low negative pressure is a polymeric filter that achieves filtration by drawing water through a thin fiber (membrane) surface into the hollow annular inner core of the fiber. Permeated water is transported through the inner core to a common header pipe where it is discharged. To improve flux rates and reduce fouling, compressed air is typically introduced at the bottom of a fiber module to agitate the fibers and induce tangential shear forces adjacent to the membrane, thereby preventing solids buildup on the individual fibers. An immersed hollow fiber membrane system, which typically operates under very low negative transmembrane pressures of less than approximately 10 pounds per square inch, is a preferred system for use on a self-contained water treatment vessel.

In both positively pressurized and vacuum driven membrane systems a gradual solids buildup will occur in the recirculation or retentate stream and periodic retentate stream wastage in both types of systems is necessary as part of the operational process to limit the influent solids concentrations to the filters. In both systems backpulsing and interim cleaning of filters is also necessary. Chemical treatments are available (oxidizing agents, alkalis and acids) to periodically backpulse and clean the membranes to restore their flux rates should fouling occur.

To implement a membrane filtration strategy for the referenced applications, the membrane filtration embodiment of the subject invention provides for the use of a "self-contained water treatment vessel," designed with water storage and equalization capacity, solids treatment and handling, and biological treatment, if needed. In essence, depending on the particular application, the invention is capable of acting as a ballast water treatment vessel, a blackwater, a graywater, or a dredge water treatment vessel, or any combination of the above.

In an embodiment for ballast water treatment of contaminated ship-board ballast water, the treatment vessel(s) would be located in, or in the vicinity of, the incoming port facility. At such a location, two operating scenarios are possible with the ballast treatment vessel. In the first, the ballast water is offloaded from a ship to a storage barge of sufficient capacity to store all the ship's ballast. This barge is subsequently brought alongside a treatment vessel, with the filters discussed earlier, and the water is discharged to the treatment vessel. In the second scenario, a treatment vessel is used which has the capacity to process water at the rate the ship is off-loading its ballast, thus eliminating the storage barge and handling required in the first scenario. This second method is preferred for its greater simplicity, but requires larger-sized treatment vessels.

In dredge water treatment operations, the treatment vessel is located directly adjacent to the dredging operation to permit the discharge of excess water into the treatment vessel or into a storage barge of sufficient capacity to store excess dredge waters, if needed, prior to discharge of the water to the treatment vessel.

In further embodiments for graywater or blackwater treatment operations, the treatment vessel or vessels are located at strategic locations either at port facilities or at designed stations where cruise or other vessels could offload their wastewaters into a storage vessel that is transported to the treatment vessel, or directly into the treatment vessel.

DESCRIPTION OF THE DRAWINGS

The present invention can best be understood in conjunction with the accompanying drawings, in which:

FIGS. 2, 3, 4 and 5 depict design concepts of the main deck, hold level, profile and section of an immersed self-contained membrane treatment vessel;

FIGS. 6, 7, 8, and 9 depict design concepts of the main deck, hold level, profile, and section of a positively pressurized self-contained membrane treatment vessel.

DESCRIPTION OF THE PREFERRED EMBODIMENT

Figure 1:
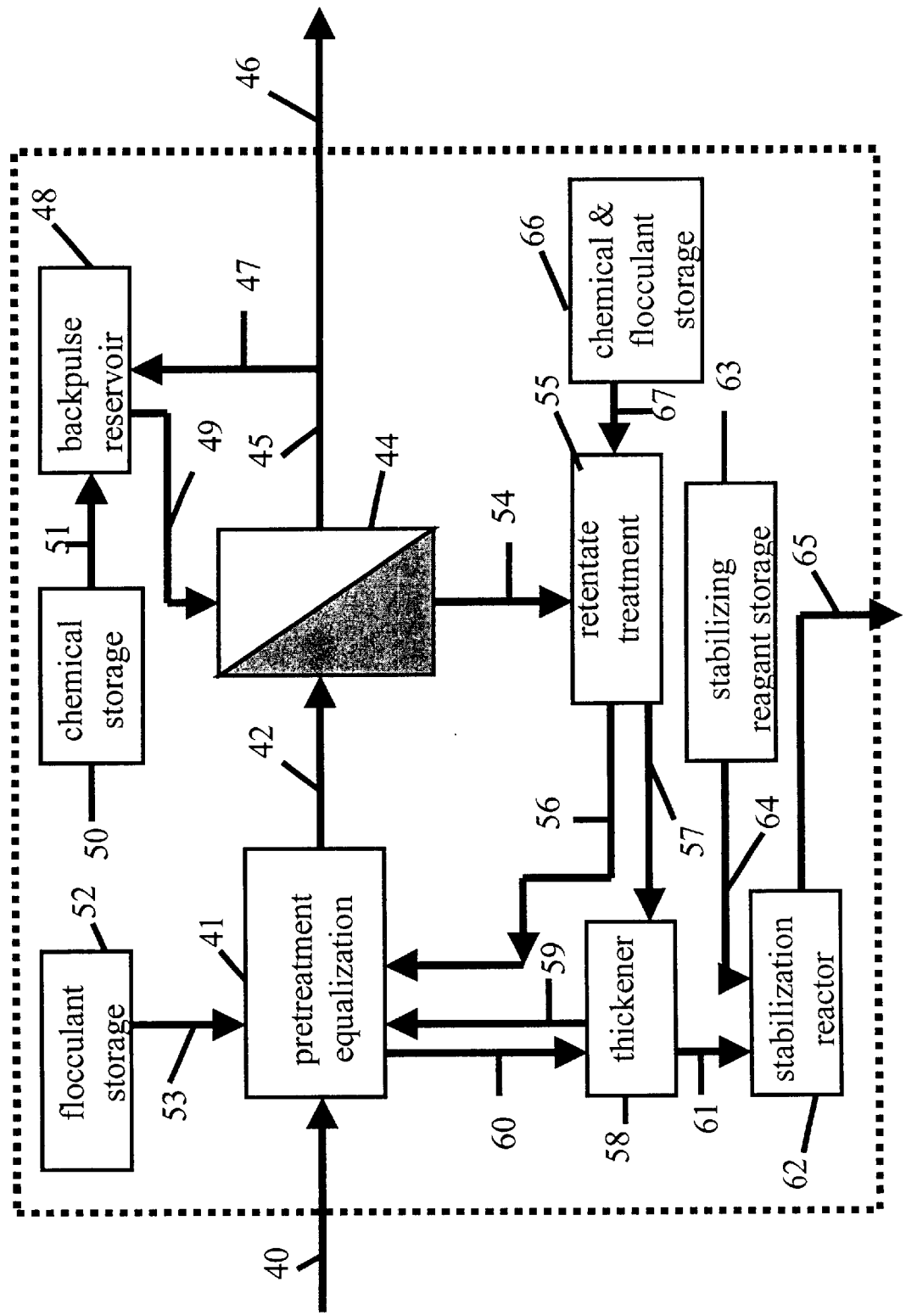
FIG. 1 is a process flow diagram depicting the flow process on-board the self-contained membrane filtration treatment vessel.

To provide for the treatment of offending wastewater, such as pumped dredge water or shipboard wastewaters, i.e. ballast water, graywater and blackwater, the present invention is a mobile floating membrane filtration water treatment system aboard a vessel. Preferably the filtration system is a polymeric membrane filtration treatment system.

For example, in this membrane water treatment system embodiment shown in FIG. 1, the process involves the collection of the offending wastewater which could include but not necessarily be limited to dredge water, ballast water, graywater, and blackwater directly from a vessel or indirectly from a storage barge by either gravity or pumped flow 40 to a self-contained water treatment vessel described subsequently and shown in FIGS. 2 through 5, for an immersed vacuum-driven vessel and FIGS. 6 through 9, for a low positively pressurized system, respectively. While the present invention is particularly suited for the treatment of the above-referenced waters, such an invention may be used to accept and treat other types of waters should the need arise. Other suitable uses for the proposed invention include the complete or partial treatment of raw surface waters for use as potable water, where such needs might exist, or for the treatment of near-shore industrial discharges.

As also shown in FIG. 1, within such vessel, the offending water is discharged to an equalization and pretreatment tank area 41. The available volumetric capacity in this area can be used to equilibrate the flow to the membrane filters 44. If the offending water is found to contain suspended solids exhibiting sufficient specific gravity to settle quickly, then such solids will be removed at this pretreatment location 41. Such location will, if necessary, be supported with chemical coagulants and/or flocculants stored at storage step 52 on board the vessel, if needed, that can be introduced at input step 53 to the pretreatment tank 41 to enhance particulate removal should additional solids removal be required.

From the pretreatment/equalization tank area 41, the offending water is pumped or gravity fed during feeding step 42 to the membrane filters 44. Either a pressurized or an immersed membrane filtration system is suitable for the subject invention.

Those who are versed in the art of membrane filtration design will recognize that complete rejection of all micron-sized and submicron sized particles (for example, greater than (0.1 micron) can readily be attained. The membrane surface area required will be dependent on the design flux rate of the membranes and the volumetric flow rate of the retentate or blowdown stream.

In a membrane system, as clean permeate is collected, the remaining retentate or recirculation stream will concentrate the non-permeating solids. To control solids buildup, a retentate or portion of the recirculation stream must be extracted (blowdown). Controlling the volumetric flow rate of the retentate or blowdown stream 54 can control the solids buildup. Solids buildup must be controlled to prevent concentration polarization or fouling of the membrane. For example, in a system with 100 percent particulate rejection (and for ballast water essentially 100 percent nuisance organism removal), which can readily be achieved using the subject filtration process, the retentate or blowdown stream flow rate can be calculated using the mass balance equation $V_{54} \cdot C_{54} = V_{42} \cdot C_{42}$, where $V_{54}$ is the retentate or blowdown stream 54 volumetric flowrate, $C_{54}$ is the particulate or suspended solids concentration of the retentate or blowdown stream 54, $V_{42}$ is the volumetric flowrate of the pretreatment system effluent stream 42, and $C_{42}$ is the particulate or suspended solids concentration of the pretreatment system effluent stream 42. Pilot studies undertaken by the inventors suggest that ratio $V_{54}/V_{42}$ ratio of less than 0.25 will adequately control solids in such water treatment systems.

Permeate from the membrane filtration system for most offending streams is treated to such an extent that discharge of such streams directly to the ambient environment at discharge step 46 is possible. For waters requiring additional treatment such as activated carbon contact, ozonation or ultraviolet radiation, such systems can readily be incorporated as tertiary treatment, into the process. If backpulsing or backwashing is used in the process, some permeate can be diverted at diversion step 47 and stored in a backpulse reservoir 48 for use in the backpulsing operation 49. Backpulsing operations involve periodic membrane backflushing. The addition of chemical oxidants (e.g., sodium hypochlorite), acids (e.g., citric acid), or alkalis (e.g., sodium carbonate) to the backpulse water will typically help control biological and/or mineral fouling of the membrane. The type of chemical additive used will be dependent on the nature of the fouling, and can be stored on-board the vessel, if needed at storage area 50.

Retentate or blowdown water 54 can be directed to a separate retentate treatment system 55 or returned directly in transport step 56 to the pretreatment system 41 for solids removal. Separate retentate treatment step 55 can be expected to include chemical treatment (flocculation) and settling and would require chemical and flocculant storage facilities 66. In a ballast water treatment system, solids collected during this treatment step 55 can be expected to be rich in microorganisms. In a dredge water treatment system subjected to contaminated sediment clean-up activities, solids collected during this treatment step 55 can be expected to contain concentrated contaminants. To assist in managing these solids, the solids can be transported at transport step 57 to a solids thickener 58 for additional thickening and excess liquid decanted at liquid decanting step 59, and returned to the pretreatment/equalization tank 41. Solids collected from the pretreatment/equalization tank 41 can also be directed in transport step 60 to this thickener 58.

Thickened solids can be transported at transport step 61 to a stabilization reactor 62 where chemical fixation or stabilization of the thickened solids will be effected. The addition of appropriate stabilization reagents, stored on board the vessel 63, can be fed at feeding step 64 to the stabilization reactor 62 to disinfect/sterilize, dewater, and solidify the solids fraction. This will ultimately provide for easier on-shore handling, transportation, and disposal of the solids collected in the process. Stabilized solids can subsequently be removed for on-shore disposal 65. Appropriate stabilizing reagents can include, but are not limited to, lime, lime kiln dust, Portland cement, cement kiln dust, or other additives capable of increasing the pH of the solids, reacting with available water (hydration reactions) and producing cementitious or pozzolanic activity.

The presence of soluble organic matter in one or more of the offending streams (particularly blackwaters) could necessitate introduction of aerobic oxidation as part of the treatment process. The recent development and application of membrane bioreactor systems for use with pressurized or immersed membrane filtration systems provides the means to manage soluble organic matter in blackwater discharges. Such systems are capable of significantly reducing biochemical oxygen demand of the blackwater discharges. The location of such treatment in the process scheme will depend on the type of membrane system incorporated into the process. Immersed membrane systems are capable of establishing bioreactors directly in the membrane reactor (Lien, 1998. Using Membrane Technology to Minimize Wastewater, Pollution Engineering, May 1998). Pressurized systems typically require separate oxidation tanks, or reactors, operated in a semi-closed loop with the membrane filter. Aeration and biosolid growth takes place in the reactor and reactor effluent is directed to the membrane, which filters the treated effluent, returning the biosolids to the aerobic reactor (Cheyan, 1998. Ultrafiltration and Microfiltration Handbook, Technomic Publishing Company, Lancaster, Pennsylvania, U.S.A., 1998; Peters, 2000. Membrane Bioreactors in Wastewater Treatment, Filtration and Separation, 37(1), Jan./Feb. 2000). Such reactors could be incorporated into the pretreatment process location 41. This possibility will become apparent upon further elaboration of the vessel design.

FIGS. 2, 3, 4, and 5 are intended to show design views through a self-contained treatment vessel containing an immersed membrane treatment system. The treatment vessel shown in FIGS. 2, 3, 4, and 5 is a barge-like vessel where pretreatment/equalization tanks 71 are shown, in FIG. 2 on the main deck plan, running down the center of the vessel. These pretreatment/equalization tanks, as described above, are available for solids removal and to provide flow equalization capacity. Membrane filters are located in membrane reactor tanks 72 (six shown for illustration only), three located on the starboard and three located on the port sides of the vessel. Hatch covers 73 placed over each of the open tanks are shown. Hatch cover removal during system maintenance can be achieved with the use of a moving crane, transported on rails down the centerline of the vessel. Such a crane and rail system 76 is shown in FIG. 5.

Diesel generators 74 are shown mounted aft of the treatment tanks along with a fuel tank 89. For immersed membrane systems, periodic cleaning of the membrane will be required and can be accomplished on-board in soaking tanks 77, shown on the main deck in FIG. 2.

Two rows of immersed membrane cartridges 78 (preferably four cartridges per row) in each reactor tank as shown in FIG. 3 on the hold level, provide the necessary surface area for the design requirements of the vessel shown.

FIG. 3 also depicts the pump room 79, which houses the compressors 80, receiver 81, and permeate pumps 82. The solids thickener 83, and solids stabilization area 84 are also shown. Space for chemical storage (flocculants, membrane cleaners, and stabilizing agents) is shown in the chemical storage location of the vessel 85. The chain locker location 88 is also depicted in FIG. 3.

FIGS. 4 and 5 assist in depicting the layout of the vessel by showing profile and sectional views. FIG. 4 shows the bulwark 86, soaking tank 77, anchor windlass 87, vessel bulkheads 90, and tug push notch 75. FIG. 5 depicts a section view of the membrane cartridges 78, the crane 76, hatch covers 73, and bulwark 86.

While FIGS. 2 through 5 focus on the design layout of an immersed membrane system, architecturally, pressurized membrane systems could readily be installed and incorporated into such a treatment vessel.

FIGS. 6, 7, 8, and 9 are intended to show design views through a self-contained treatment vessel containing a positively pressurized (low pressure) membrane treatment system. The treatment vessel shown in FIGS. 6, 7, 8, and 9 is similar to that shown in FIGS. 2 through 5 in that it is a barge-like vessel that contains equalization and pretreatment tanks, solids handling equipment, and chemical storage, pumps, generators, receivers, and compressors. Pressurized membranes are typically contained in sealed tubular cartridges or modules for pressure control, into which effluent flow from pretreatment tanks is pumped and permeate and retentate streams extracted. Pressurized modules that do not require water-filled tanks, provide the advantage of a lower weight system, when compared to an immerse vacuum-driven membrane system.

FIG. 6 shows a plan view of the main deck and depicts a main deck enclosure (building) 10 that houses a membrane treatment system consisting of racks of modules 11 (four module racks shown for illustration purposes only). Also shown within the main deck enclosure 10 is an equipment room 12 that houses the generators, pumps, compressors, receivers, chemical storage, and heating equipment. The main deck enclosure is located aft of the first set of equalization tanks (three shown for illustration purposes only). The top hatches 13 of these tanks, shown in FIG. 6, are also shown in FIG. 8. FIG. 6 also depicts the location of a hydraulic crane 14, used to lift the hatch covers, and also depicts the anchor windlass 15.

FIG. 7 shows a plan view of the hold level of the vessel depicting additional equalization and pretreatment tanks 16 and capacity below deck (nine tanks are shown for illustration purposes only). Also shown in FIG. 7 is the fuel tank 17, chain locker 18 as well as the solids thickener area 19 and stabilization area 20.

FIG. 8 is a profile view of the treatment vessel depicting the main deck enclosure 10, equipment room 12, tug push notch 21, hatch cover 13, anchor windlass 15, and the pretreatment and equalization tanks 16. FIG. 9 depicts a sectional view showing the deck housing frame 22 and the four module racks 11.

The specific layouts presented in the referenced figures is are intended to illustrate additional general design detail associated with the self-contained treatment vessel concept. Although the aforementioned particular embodiments are shown and described herein, it is understood that various other modifications may be made without departing from the scope of the invention, as noted in the appended claims.

We claim:

1. A system for treating contaminated water comprising:
    a mobile, floating self contained treatment vessel having a means for transporting of contaminated water from a separate physical location;
    a collector on said mobile floating treatment vessel collecting said contaminated water directly from a contaminated water source at said separate physical location to said self-contained water treatment vessel, said separate physical location being spaced apart from said mobile floating treatment vessel,
    at least one membrane filtration system using at least one filter capable of filtering and removing solids,
    said at least one membrane filtration system receiving and treating said contaminated water to an uncontaminated state, and,
    an output directly discharging said treated uncontaminated water.

2. The system for treating contaminated water as in claim 1 wherein said physical location having said contaminated water source spaced apart from said mobile floating treatment vessel is a second floating vessel being connected to said collector connecting said second floating vessel to said mobile floating treatment vessel.

3. The system for treating contaminated water as in claim 1 wherein said physical location having said contaminated water source spaced apart from said mobile floating treatment vessel is raw unpotable surface water of a natural body of water being connected to said collector connecting said natural body of water to said mobile floating treatment vessel.

4. The system for treating contaminated water as in claim 1 wherein said physical location having said contaminated water source spaced apart from said mobile floating treatment vessel is polluted water of a natural body of water, said natural body of water being connected to said collector connecting said natural body of water to said mobile floating treatment vessel.

5. The system for treating contaminated water as in claim 1 wherein said physical location having said contaminated water source spaced apart from said mobile floating treatment vessel to is wastewater from an on-shore discharge source at a remote location spaced apart from mobile floating treatment vessel, said discharge source being connected to said collector connecting said discharge source to said mobile floating treatment vessel.

6. The system for treating contaminated water as in claim 1 wherein said means for transporting said contaminated water is a pump.

7. The system for treating contaminated water as in claim 1 wherein said means for transporting to said collector is gravity feed.

8. The system for treating contaminated water as in claim 1 wherein said treated uncontaminated water is discharged to an ambient marine environment.

9. The system for treating contaminated water as in claim 1 wherein said membrane filtration system is a microfiltration system.

10. The system for treating contaminated water as in claim 1 wherein said membrane filtration system is an ultrafiltration system.

11. The system for treating contaminated water as in claim 1 wherein said membrane filtration system uses filters capable of filtering solids in a microfiltration to ultrafiltration size range.

12. The system for treating contaminated water as in claim 1 further comprising at least one membrane filtration system of a microfiltration system and an ultrafiltration system for removing particulates from water retained by said housing during removal of sediment.

13. The system for treating contaminated water as in claim 1 further comprising a post-treatment system for removal of residual soluble contaminants from the filtration system effluent stream.

14. The system for treating contaminated water as in claim 1 wherein said contaminated water is marine ship ballast water.

15. The system for treating contaminated water as in claim 14 wherein said at least one membrane filtration system removes substantially all nuisance organisms before discharging the water into an ambient coastal waterway.

16. The system for treating contaminated water as in claim 1 wherein said contaminated water is marine ship graywater.

17. The system for treating contaminated water as in claim 1 wherein said contaminated water is marine ship blackwater.

18. The system for treating contaminated water as in claim 1 wherein said contaminated water is dredged water.

19. The system for treating contaminated water as in claim 1, wherein said at least one membrane filtration system comprises at least one pretreatment equalization tank area (41) for receiving said contaminated water (40); said at least one filtration system comprising at least one filtration area (44); said at least one filtration area (44) having said at least one filter therein.

20. The system for treating contaminated water as in claim 1 wherein said at least one membrane filtration system comprises at least one storage means, respectively, for chemical coagulants and for chemical flocculants, said coagulants and flocculants for enhancing removal of aquatic particles that are amenable to such removal treatment; said chemical enhanced particle removal occurring at said at least one pretreatment equalization tank area (41).

21. The system for treating contaminated water as in claim 1 wherein said at least one membrane particulate filtration system includes at least one storage means, respectively having at least one chemical/reagent for stabilizing solids obtained during said contaminated water treatment.

22. The system for treating contaminated water of claim 21, wherein solids are further stabilized into disposable form by at least one finishing stabilization means.

23. The system for treating contaminated water of claim 22 wherein said at least one chemical/reagent comprises lime.

24. The system for treating contaminated water of claim 22 wherein said at least one chemical/reagent comprises at least one Pozzolanic reagent.

25. The system for treating contaminated water of claim 22 wherein said at least one chemical/reagent comprises at least one cementitious reagent.

26. The system for treating contaminated water as in claim 1, wherein said at least one filtration system comprises a positively pressurized membrane filtration means.

27. The system for treating contaminated water as in claim 1, wherein said at least one filtration means comprises a negatively pressurized membrane filtration means.

28. The system for treating contaminated water as in claim 1 further comprising:
means for selectively and controllably backpulsing said at least one membrane filtration system (47), (48) and (49); said backpulsing means comprising at least one backpulsing reservoir (48), at least one water flow conduit (47) connecting said water treatment with said backpulsing reservoir; and,
means for selectively and controllably treating said backpulsed water with chemicals to control biological and/or mineral fouling of said at least one filtration means.

29. The system for treating contaminated water as in claim 21 further comprising a further treatment assembly receiving water retained by said membrane filtration system.

30. The system for treating contaminated water as in claim 29 wherein said further treatment assembly comprises at least one retentate treatment assembly.

31. The system for treating contaminated water as in claim 29 wherein said further treatment assembly comprises a blowdown treatment assembly.

32. The system for treating contaminated water as in claim 29 wherein said farther treatment assembly comprises a diverter returning water retentate directly (56) to said at least one pretreatment system (41) for the removal of contaminants and solids therefrom.

33. The system for treating contaminated water as in claim 29 wherein said further treatment assembly comprises a diverter returning water blowdown directly (56) to said at least one pretreatment system (41) for the removal of contaminants and solids therefrom.

34. The system for treating contaminated water as in claim 29 wherein said further treatment assembly comprises flocculation chemical treatment.

35. The system for treating contaminated water as in claim 29 wherein said further treatment assembly comprises a solid settling means permitting settling of solids from said treated water.

36. The system for treating contaminated water as in claim 29 further comprising means for treating and stabilizing of solids collected from said further treatment assembly, at least conveyance mechanism transporting settled solids to at least one solids thickening area (58) for additional thickening and liquid decanting; said decanted liquid being returned (59) to said at least one pretreatment equalization tank area (40); and wherein said at least one filtration system comprises means for directing solids (60) collected at said at least one pretreatment equalization tank area to said at least one solids thickening area (58).

37. The system for treating contaminated water as in claim 36 further comprising at least one stabilization reactor (62) for stabilizing thickened solids from said at least one thickening area (58) and means (61) for pumping thickened solids from said at least one solids thickening area (58) to said at least one stabilization reactor (62); and a discharger for discharging permeate from said filtration system directly into an ambient coastal waterway (65).

38. The system for treating contaminated water of claim 1, wherein said membrane filtration system comprises hollow fiber membrane filtration means.

39. The system for treating contaminated water of claim 1, further comprising at least one additional storage vessel having means for storing said contaminated water to be treated.

40. A method for treating contaminated water comprising the steps of:
directing an intake stream of water to be treated into an apparatus comprised of a plurality of water tanks, pumps and filters;
directing said intake stream to at least one pretreatment/equalization tank (41);
analyzing said intake stream at said at least one pretreatment/equalization tank (41) for the presence of sufficient solids to warrant one of settling treatment and chemical additive treatment; and in the event that solids in said intake water stream warrant, treating said stream at said at least one pretreatment/equalization tank (41) with settling treatment and/or with chemical additive treatment;

directing a further stream of said water from said at least one pretreatment / equalization tank (41) to at least one membrane filtration system (44) of an ultrafiltration system and a microfiltration system;

intermittently and selectively backpulsing the flow of said water from said at least one membrane filtration system (44) into at least one backpulse reservoir (47, 48, 49) through suitable water conduits connecting said at least one backpulse reservoir (47, 48, 49) with said at least one membrane filtration system (44);

treating said backpulsed water as needed with settling and/or with chemical additives to remove solids therefrom; and discharging water permeate that has been subjected to said at least one membrane filtration system directly into a marine aquatic environment.

* * * * *